US006923459B2

(12) United States Patent
Yeo et al.

(10) Patent No.: US 6,923,459 B2
(45) Date of Patent: Aug. 2, 2005

(54) 3-WHEEL VEHICLE BOARD

(75) Inventors: In Cheoul Yeo, Incheon (KR); In Young Yeo, Los Angeles, CA (US)

(73) Assignee: Byung Soo Jang (KR)

( * ) Notice: Subject to any disclaimer, the term of this patent is extended or adjusted under 35 U.S.C. 154(b) by 0 days.

(21) Appl. No.: 10/638,634

(22) Filed: Aug. 11, 2003

(65) Prior Publication Data

US 2005/0001399 A1 Jan. 6, 2005

(30) Foreign Application Priority Data

Jul. 2, 2003 (KR) .............................. 20-2003-0021107 U (51) Int. Cl.[7] .............................................. B62M 1/00
(52) U.S. Cl. .................................. 280/87.041; 280/220
(58) Field of Search ........................... 280/87.041, 282, 280/87.042, 87.021, 639, 220; 16/110.1, 436, 421; 74/551.3, 551.1, 551.8; 403/321, 322.2, 324

(56) References Cited

U.S. PATENT DOCUMENTS

| | | | | |
|---|---|---|---|---|
| 604,371 A | * | 5/1898 | Cook ......................... | 74/551.4 |
| 2,170,978 A | * | 8/1939 | Smith ....................... | 280/87.05 |
| 4,165,093 A | * | 8/1979 | Biskup ....................... | 280/220 |
| 4,394,029 A | * | 7/1983 | Holmgren .............. | 280/87.041 |
| 5,435,204 A | * | 7/1995 | Marui ....................... | 74/551.4 |
| 5,500,635 A | * | 3/1996 | Mott ....................... | 340/323 R |
| 5,785,331 A | * | 7/1998 | Rappaport ............. | 280/87.041 |
| 6,173,976 B1 | * | 1/2001 | Lee ....................... | 280/87.041 |
| 6,220,612 B1 | | 4/2001 | Beleski, Jr. ............ | 280/87.041 |
| 6,305,698 B1 | * | 10/2001 | Liang ..................... | 280/87.041 |
| 6,317,923 B1 | * | 11/2001 | Lo ............................. | 16/110.1 |
| 6,499,751 B1 | | 12/2002 | Beleski, Jr. ............ | 280/87.041 |
| 6,505,845 B1 | * | 1/2003 | Fong .......................... | 280/228 |
| 6,517,093 B2 | * | 2/2003 | Feng ..................... | 280/87.042 |
| 6,554,302 B1 | * | 4/2003 | Liu ....................... | 280/87.041 |

* cited by examiner

*Primary Examiner*—Hau Phan
(74) *Attorney, Agent, or Firm*—Cantor Colburn LLP (57) ABSTRACT

A 3-wheel vehicle board which can stably maintain height of a handle bar and change a driving posture in various forms. The 3-wheel vehicle board includes a pair of handle bars provided in the upper end thereof, a handle bar shaft with the lower end of which a front wheel is rotatably combined, a second hollow shaft with which the handle bar shaft is slidably combined, a first hollow shaft with which the second hollow shaft is rotatably combined, a locking/unlocking unit for fixing and releasing position of the handle bar shaft with respect to the second hollow shaft, a fixing block which is fixed to the lower end of the first hollow shaft, first and second rotatable links with each one end of which each one end of the fixing block is rotatably combined, a connection block with each one end of which the respective middle portions of the first and second rotatable links are rotatably combined, and with the middle portion of which the fixing block is rotatably combined, first and second foothold links which are rotatably combined with each one end of the first and second rotatable links with a hinge pin and on each one end of which each foothold and each rear wheel are provided, and a clamping unit which fixes the first and second foothold links horizontally and vertically with respect to the first and second rotatable links.

6 Claims, 9 Drawing Sheets

3-WHEEL VEHICLE BOARD

BACKGROUND OF THE INVENTION

1. Field of the Invention

The present invention relates to a 3-wheel vehicle board, and more particularly, to a 3-wheel vehicle board which can stably maintain height of a handle bar and change a driving posture in various forms.

2. Description of the Related Art

A 3-wheel vehicle board has been developed differently from a two-wheel kick board. The 3-wheel vehicle board is used as sports equipment since a rider can run forwards even if he/she does not land on the ground to generate a running force. The 3-wheel vehicle board has a structure that a pair of rear tail arms are connected to the lower end of a front column where a handle bar is mounted, a steering wheel is installed in the lower end of the front column, and a rear wheel is installed in the rear end of each rear tail arm.

FIGS. 1 through 4 illustrate an example of the 3-wheel vehicle board. Referring to FIGS. 1 through 4, the 3-wheel vehicle board includes a handle bar 11 provided in the upper end thereof, a handle bar shaft 10 with the lower end of which a front wheel 51 is rotatably combined, a second hollow shaft 25 with which the handle bar shaft 10 is slidably combined, a first hollow shaft 20 with which the second hollow shaft 25 is rotatably combined, a locking/unlocking unit for fixing and releasing position of the handle bar shaft 10 with respect to the second hollow shaft 25, a fixing block 70 which is fixed to the lower end of the first hollow shaft 20, first and second rotatable links 31 and 32 with each one end of which each one end of the fixing block 70 is rotatably combined, a connection block 80 with each one end of which the respective middle portions of the first and second rotatable links 31 and 32 are rotatably combined, and with the middle portion of which the fixing block 70 is rotatably combined, first and second foothold links 41 and 42 which are rotatably combined with each one end of the first and second rotatable links 31 and 32 with a hinge pin 91 or 92 and on each one end of which each foothold 61 or 62 and each rear wheel 52 or 53 are provided, and a clamping unit which fixes the first and second foothold links 41 and 42 horizontally and vertically with respect to the first and second rotatable links 31 and 32.

Figure 1:
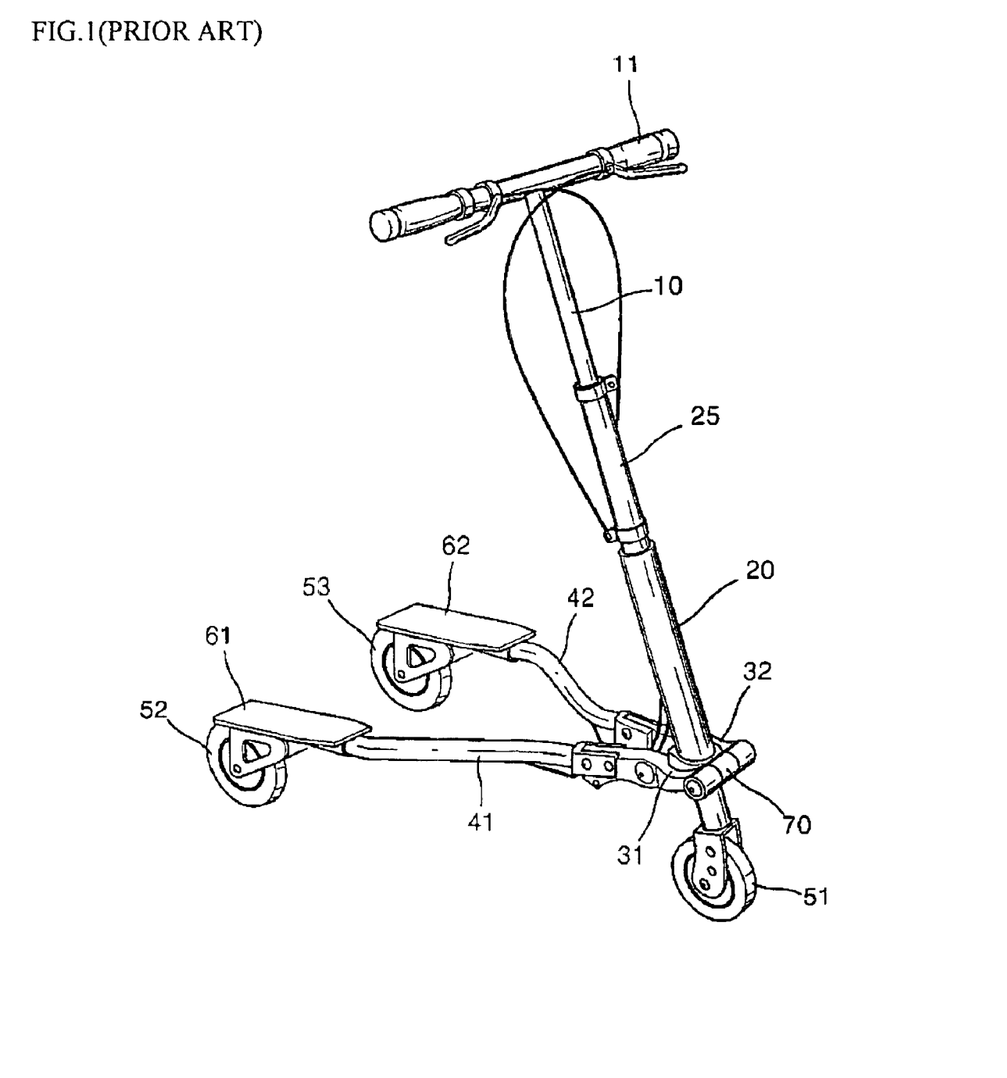
FIG. 1 is a perspective view showing a conventional vehicle board.
Figure 2:
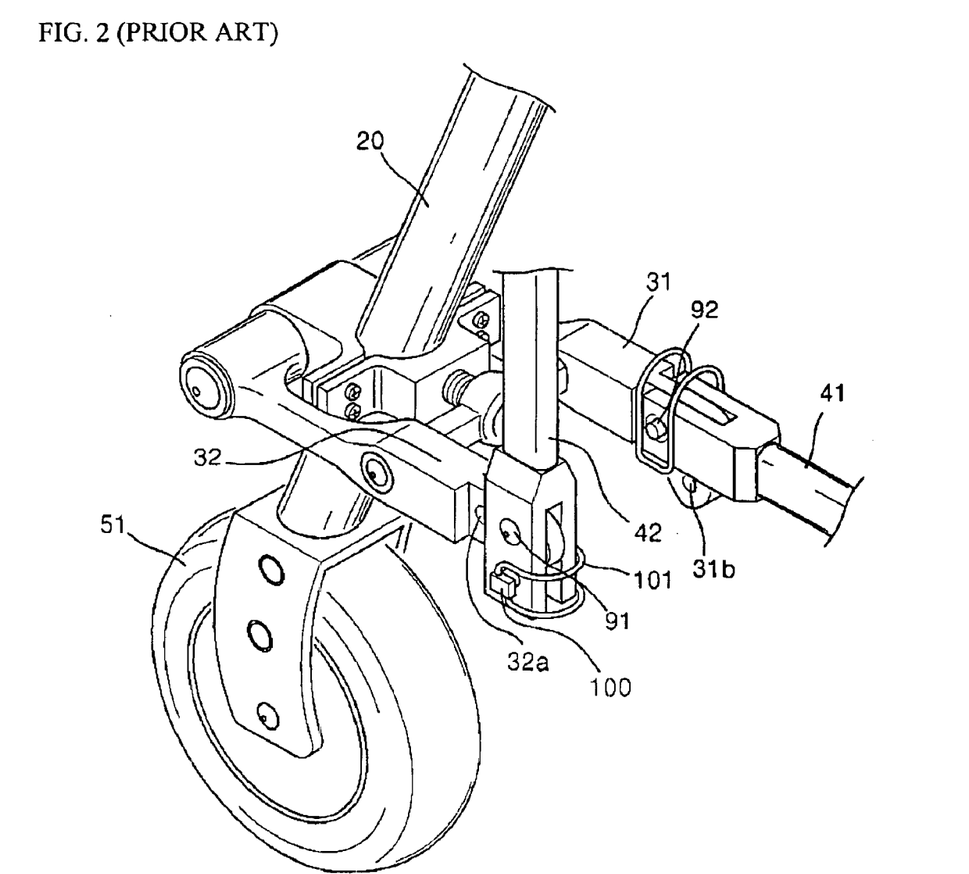
FIG. 2 is an enlarged perspective view showing a front wheel portion of FIG. 1.
Figure 3:
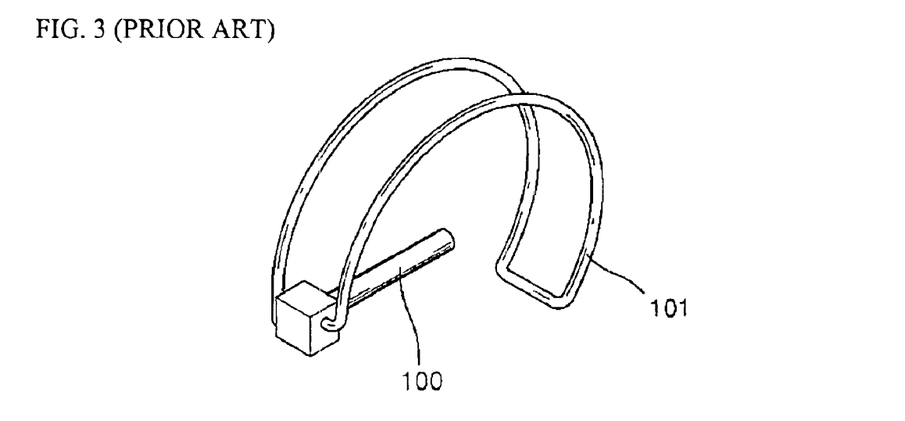
FIG. 3 is a perspective view showing a locking pin employed in the FIG. 2 front wheel portion.
Figure 4:
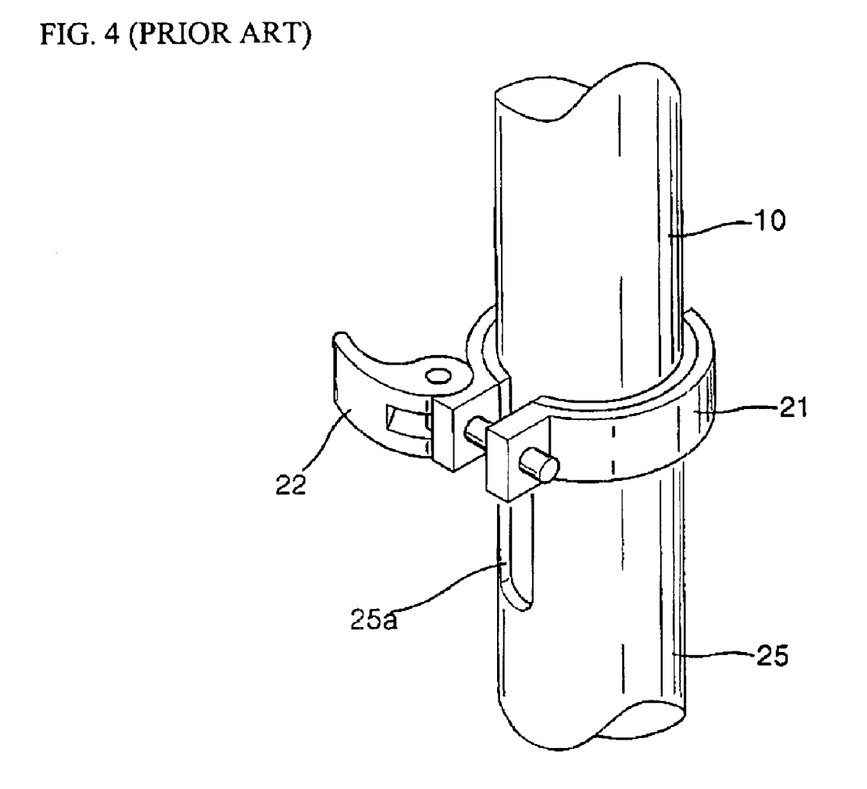
FIG. 4 is a perspective view showing a portion extracted from a fixing portion of a conventional handle bar shaft.

Referring to FIGS. 1 and 4, the locking/unlocking unit includes an elastic plate 21 whose ends are spaced by a predetermined gap and then surround the outer circumferential surface of the second hollow shaft 25, and a locker 22 which tightens or releases both the ends of the elastic plate 21, in which the inner diameter of the second hollow shaft 25 is reduced by tightening the elastic plate 21 to thus fix the handle bar shaft 10. In order to change the inner diameter of the second hollow shaft 25, a slit 25a is formed perpendicularly from the upper end of the second hollow shaft 25. Referring to FIGS. 2 and 3, coupling holes are formed on the leading ends of the first and second foothold links 41 and 42, first and second locking holes 32a and 31b spaced by a predetermined angle with respect to rotational pins 91 and 92 are formed on the leading ends of the first and second rotatable links 31 and 32, and the first and second locking holes 32a and 31b are selectively coupled to the coupling holes with locking pins 100. As shown in FIGS. 2 and 3, the first and second locking holes in the first and second rotatable links 31 and 32 are formed identically, and thus only visible components in the drawings are assigned with reference numerals. Referring to FIG. 3, an elastic wire 101 curved in the form of an arc is further provided in order to couple both the ends of the locking pin 100 and surround the first and second rotatable links 31 and 32 and the first and second foothold links 41 and 42. The locking pin 100 is surrounded by the elastic wire 101 to thereby prevent separation from the locking hole.

However, the 3-wheel vehicle board has the following problems.

Firstly, since the handle bar 11 is formed in the form of a straight line, and is combined vertically with the handle bar shaft 10, the 3-wheel vehicle board is difficult to adapt itself to the physical conditions or driving posture of a user.

Secondly, since the handle bar 11 is fixed by the lateral surface pressure of the locker 22 after the height of the handle bar 11 has been adjusted, the 3-wheel vehicle board is vulnerable to the vertical pressure. As a result, the height adjusted handle bar can be moved to accordingly cause a safety accident.

Thirdly, since the first and second rotatable links 31 and 32 and the first and second foothold links 41 and 42 are combined with the locking pins 100 further including the elastic wires 101, it is burdensome to assemble and disassemble the components into and from the 3-wheel vehicle board, respectively.

Finally, since impacts are transferred to the handle bar 11 via the front wheel 51 from the ground, a sense of boarding goes bad during running.

SUMMARY OF THE INVENTION

To solve the above problems, it is an object of the present invention to provide a 3-wheel vehicle board which can adjust height of a handle bar according to the physical conditions of a user and stably maintain height of the handle bar.

It is another object of the present invention to provide a 3-wheel vehicle board which can change position of a handle bar to thereby change a driving posture of a user in various forms.

It is still another object of the present invention to provide a 3-wheel vehicle board which can improve structure of a locking pin which can assemble and disassemble links to and from each other, to thereby assemble and disassemble them conveniently.

It is yet another object of the present invention to provide a 3-wheel vehicle board which absorbs impacts caused by contact to the ground during running to thereby enhance a sense of boarding.

It is still yet another object of the present invention to provide a 3-wheel vehicle board having ambient lightings which can prevent a safety accident during running at night.

To accomplish the above object of the present invention, there is provided a 3-wheel vehicle board comprising: a pair of handle bars provided in the upper end thereof; a handle bar shaft with the lower end of which a front wheel is rotatably combined; a second hollow shaft with which the handle bar shaft is slidably combined; a first hollow shaft with which the second hollow shaft is rotatably combined; a locking/unlocking unit for fixing and releasing position of the handle bar shaft with respect to the second hollow shaft; a fixing block which is fixed to the lower end of the first hollow shaft; first and second rotatable links with each one end of which each one end of the fixing block is rotatably combined; a connection block with each one end of which the respective middle portions of the first and second rotatable links are rotatably combined, and with the middle portion of which the fixing block is rotatably combined; first and second foothold links which are rotatably combined with each one end of the first and second rotatable links with a hinge pin on each one end of which each foothold and each rear wheel are provided; and a clamping unit which fixes the first and second foothold links horizontally and vertically with respect to the first and second rotatable links, wherein a handle bar fixing unit is fixed to the upper end of the handle bar shaft in which a plurality of throughholes through which the handle bars are attachably and detachably coupled are formed on both ends of the handle bar fixing unit, wherein each handle bar is bent on the one end of which a coupling portion coupled with the handle bar fixing unit is formed and on the other end of which a handle bar grip portion is formed, and wherein locking protrusions coupled with the throughholes in the handle bar fixing unit are coupled in and out with the handle bar coupling portion.

The locking/unlocking unit has a structure that locking holes are formed up and down with a predetermined interval on the second hollow shaft and fixing protrusions locked into the locking holes are coupled in and out with the handle bar shaft.

The clamping unit includes locking pin blocks penetratively coupled with the first and second foothold links and the first and second rotatable links, respectively, and the locking pin blocks each comprises a hollow body having a coupling hole with which a fixing ball is coupled in and out, an operational rod having a recess into which the fixing ball is inserted so as to be slidably coupled with the hollow body, and a spring elastically biasing the operational rod in one direction with respect to the hollow body.

Also, the 3-wheel vehicle board is provided with a spring on the first hollow shaft, which can absorb impacts from the front wheel.

Also, the 3-wheel vehicle board further comprises an impact sensor which detect the impacts from the ground during running, and at least one lamp which lights according to the detection of impacts from the impact sensor, so as to be easily identified during running at night.

BRIEF DESCRIPTION OF THE DRAWINGS

The above and other objects and advantages of the present invention will become more apparent by describing the preferred embodiment thereof in more detail with reference to the accompanying drawings in which.

DETAILED DESCRIPTION OF THE INVENTION

A 3-wheel vehicle board according to the present invention will be described below in detail with reference to the accompanying drawings.

Referring to FIGS. 5 through 9B, the 3-wheel vehicle board includes a pair of handle bars 110 and 120 provided in the upper end thereof, a handle bar shaft 140 with the lower end of which a front wheel 201 is rotatably combined, a second hollow shaft 160 with which the handle bar shaft 140 is slidably combined, a first hollow shaft 150 with which the second hollow shaft 160 is rotatably combined, a locking/unlocking unit for fixing and releasing position of the handle bar shaft 140 with respect to the second hollow shaft 160, a fixing block 230 which is fixed to the lower end of the first hollow shaft 150, first and second rotatable links 240 and 250 with each one end of which each one end of the fixing block 230 is rotatably combined, a connection block 260 with each one end of which the respective middle portions of the first and second rotatable links 240 and 250 are rotatably combined, and with the middle portion of which the fixing block 230 is rotatably combined, first and second foothold links 210 and 220 which are rotatably combined with each one end of the first and second rotatable links 240 and 250 with a hinge pin and on each one end of which each foothold 204 or 205 and each rear wheel 202 or 203 are provided, and a clamping unit which fixes the first and second foothold links 210 and 220 horizontally and vertically with respect to the first and second rotatable links 240 and 250.

Figure 5:
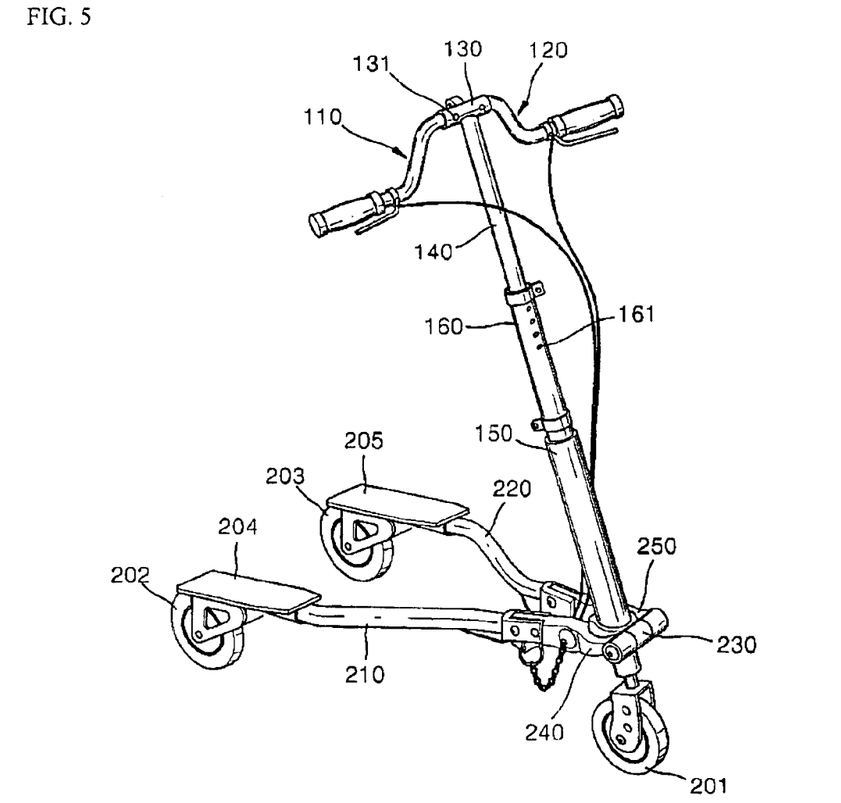
FIG. 5 is a perspective view showing a vehicle board according to the present invention.
Figure 6:
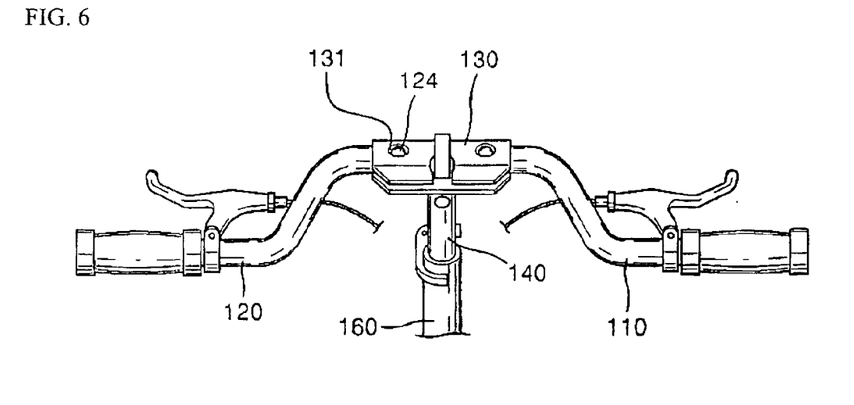
FIG. 6 is a perspective view showing a handle bar portion of FIG. 5.

Referring to FIGS. 5 and 6, a handle bar fixing unit 130 is fixed to the upper end of the handle bar shaft 140 in which a plurality of throughholes through which the handle bars 110 and 120 are attachably and detachably coupled are formed on both ends of the handle bar fixing unit 130. Here, the handle bar fixing unit 130 is perpendicular with the handle bar shaft 140.

Figure 7A:
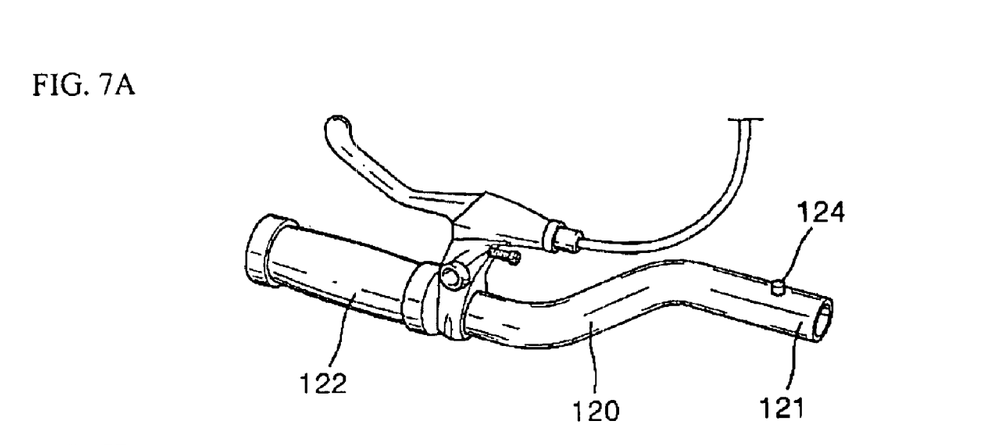
FIG. 7A is a perspective view showing a handle bar employed in the sooter board according to the present invention.

As shown in FIG. 7A, each handle bar 110 or 120 is bent on the one end of which a coupling portion 121 coupled with the handle bar fixing unit 130 is formed and on the other end of which a handle bar grip portion 122 is formed. Also, locking protrusions 124 coupled with the throughholes 131 in the handle bar fixing unit 130 are coupled in and out with the handle bar coupling portion 121 in the handle bar 110 or 120.

Figure 7B:
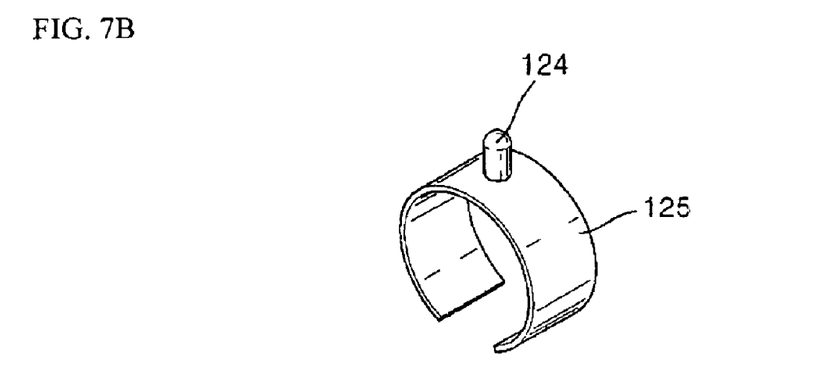
FIG. 7B is a perspective view showing a locking protrusion which is combined with a connection unit of the handle bar.

As shown in FIG. 7B, the locking protrusion 124 is fixed to an arc-shaped plate spring 125. The plate spring 125 is closely coupled with the inner circumferential surface of the coupling portion 121 in the handle bar 110 or 120, and simultaneously the locking protrusion 124 is coupled with the throughhole 131. Thus, when the locking protrusion 124 is pressed, the plate spring 125 is elastically deformed and inserted into the inner side of the coupling portion 121. When the pressure of the locking protrusion 124 is released, the locking protrusion 124 is protruded outwards from the coupling portion 121 by restoration of the plate spring 125.

Figure 8:
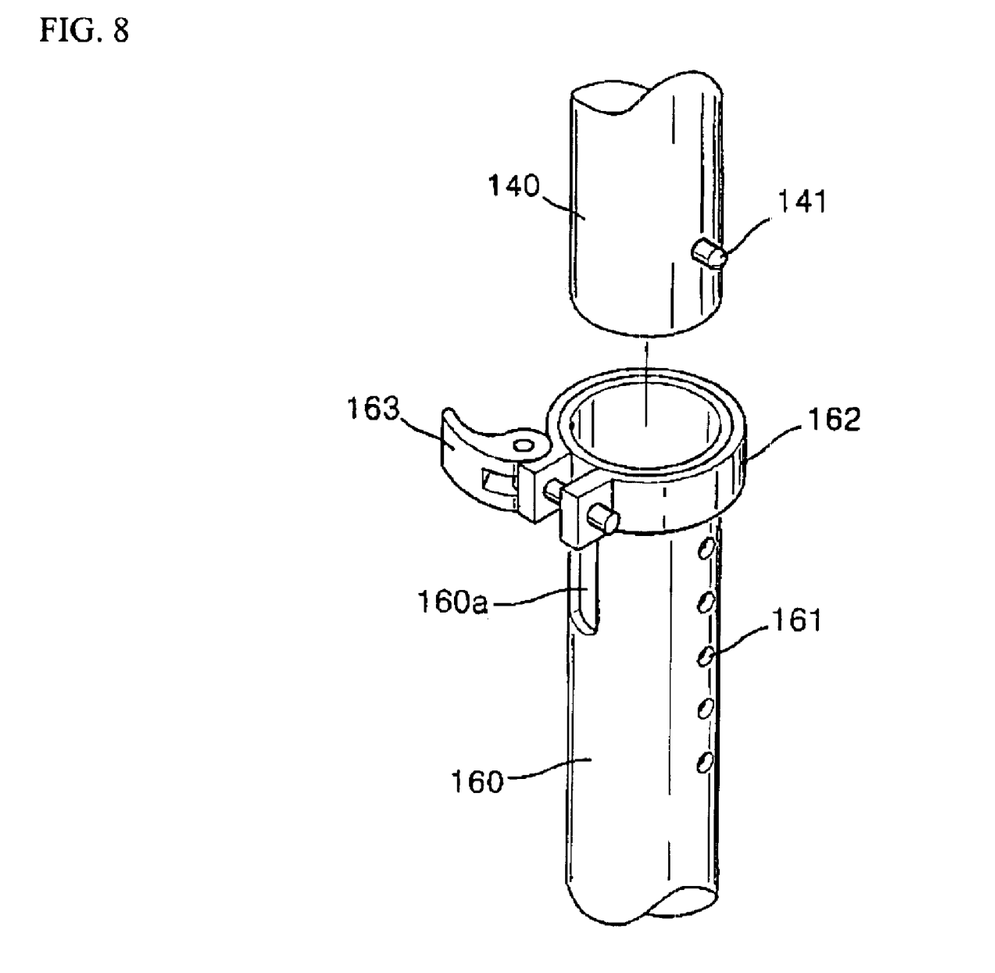
FIG. 8 is a perspective view showing a portion extracted from a height adjustment unit of a handle bar shaft.

Referring to FIGS. 5 and 8, the locking/unlocking unit has a structure that locking holes 161 are formed up and down with a predetermined interval on the second hollow shaft 160 and fixing protrusions 141 locked into the locking holes 161 are coupled in and out with the handle bar shaft 140. Here, since the fixing protrusions 141 function in the substantially same manner as those of the locking protrusions 124 of FIG. 7B, the detailed description thereof will be omitted. Also, the locking/unlocking unit includes an elastic plate 162 whose ends are spaced by a predetermined gap and then surround the outer circumferential surface of the second hollow shaft 160, and a locker 163 which tightens or releases both the ends of the elastic plate 162, in which the inner diameter of the second hollow shaft 160 is reduced by tightening the elastic plate 162 to thus fix the handle bar shaft 140. In order to change the inner diameter of the second hollow shaft 160, a slit 160a is formed perpendicularly from the upper end of the second hollow shaft 160.

Figure 9A:
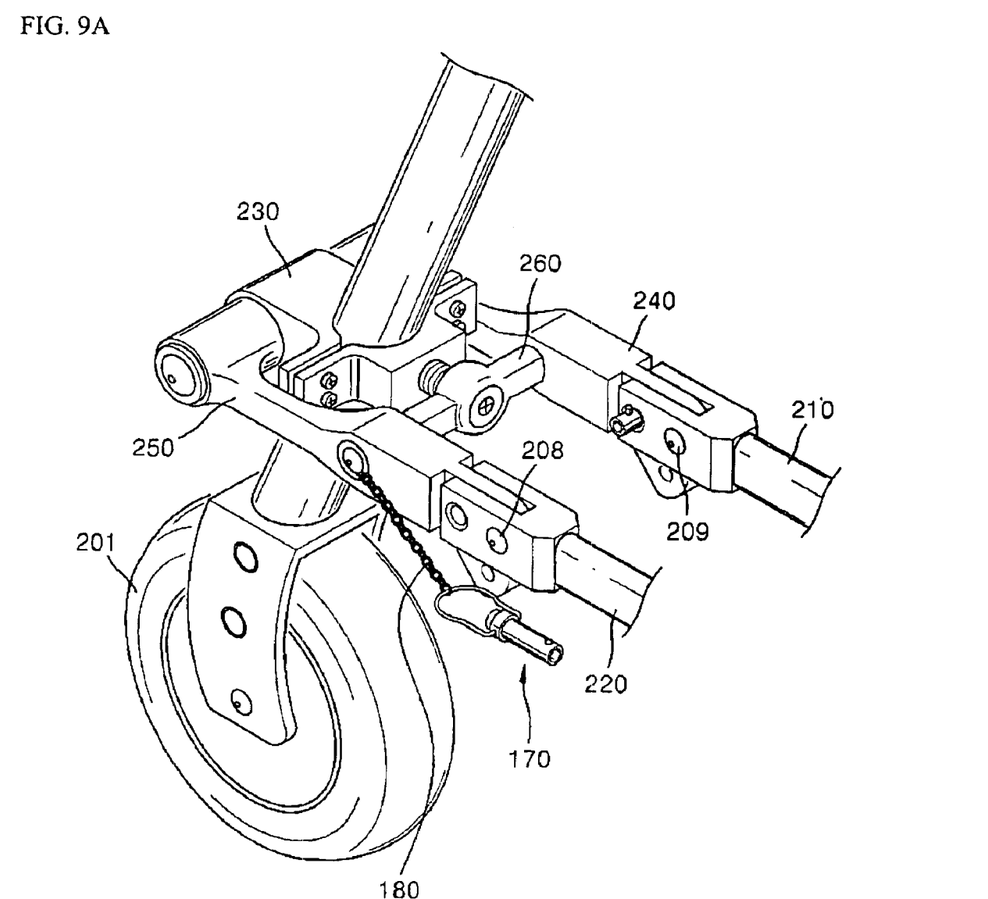
FIG. 9A is a perspective view showing a portion extracted from a front wheel portion in the vehicle board according to the present invention.
Figure 9B:
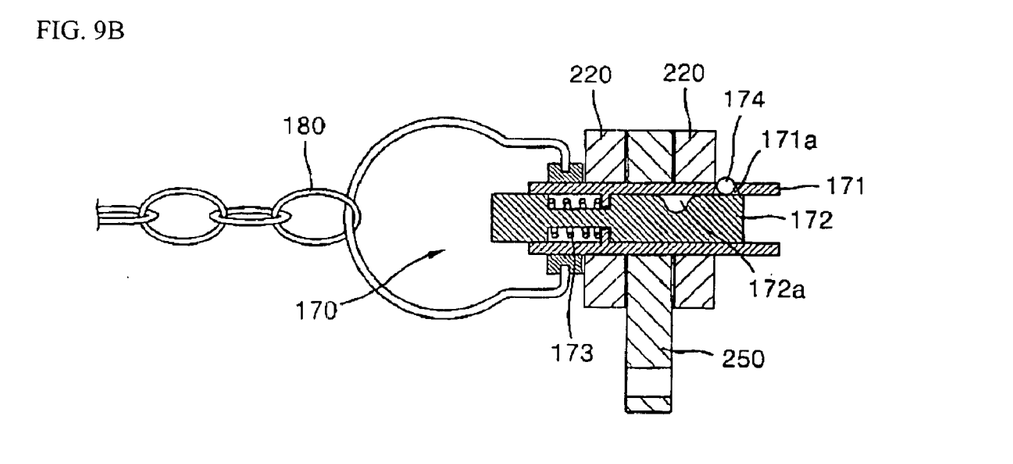
FIGS. 9B and 9C are cross-sectional views showing an operational state of a locking pin block, respectively.
Figure 9C:
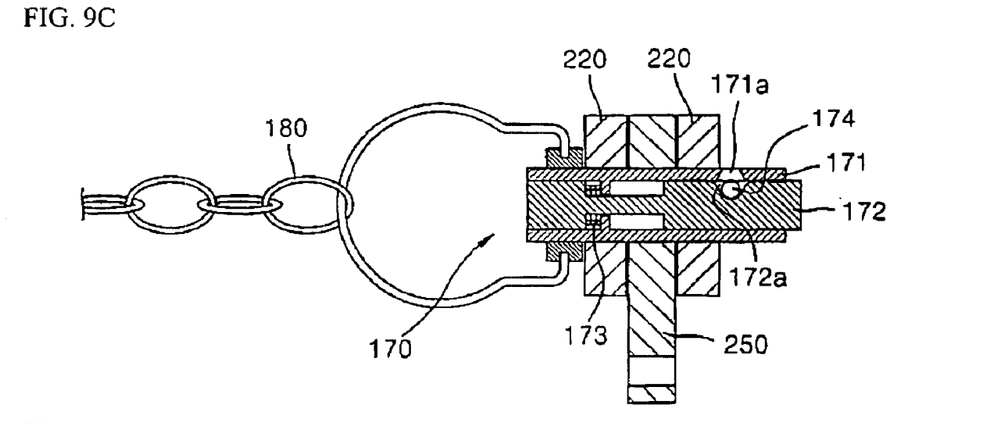

Referring to FIGS. 9A through 9C, the clamping unit includes locking pin blocks 170 penetratively coupled with the first and second foothold links 210 and 220 and the first and second rotatable links 240 and 250, respectively. The locking pin blocks 170 each comprises a hollow body 171 having a coupling hole 171a with which a fixing ball 174 is coupled in and out, an operational rod 172 having a recess 172a into which the fixing ball 174 is inserted so as to be slidably coupled with the hollow body 171, and a spring 173 elastically biasing the operational rod 172 in one direction with respect to the hollow body 171. Since the locking blocks 170 can be coupled with the first and second rotatable links 240 and 250 by connection rings 180, loss or missing can be prevented.

Figure 10:
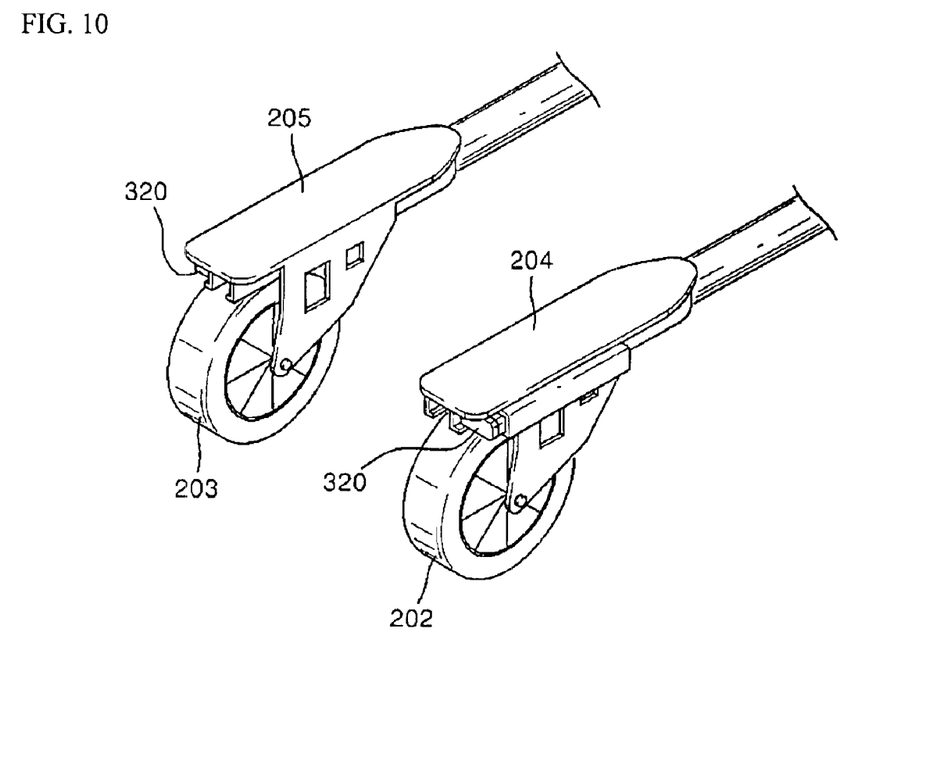
FIG. 10 is a perspective view showing a rear wheel portion of the vehicle board according to the present invention.
Figure 11:
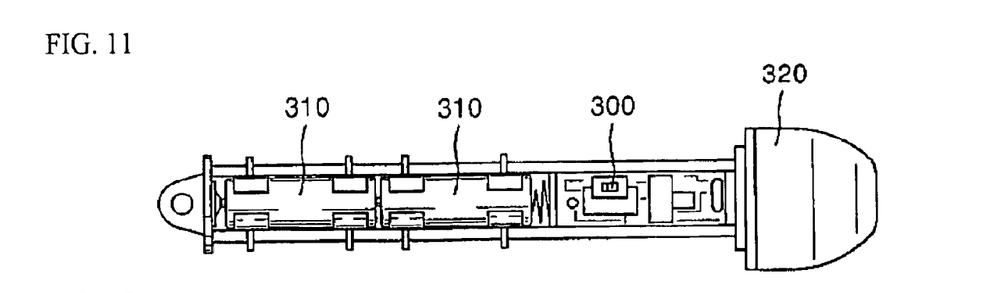
FIG. 11 is a plan view showing an impact sensor and a lamp which are employed in the vehicle board according to the present invention.

Also, as shown in FIGS. 10 and 11, the 3-wheel vehicle board further includes an impact sensor 300 which detects impacts from the ground during running, and at least one lamp 320 which lights according to the detection of impacts from the impact sensor 300, on the bottom of the footholds 204 and 205 so as to be easily identified during running at night. A reference numeral 310 denotes a battery which supplies power to a detection circuit of the impact sensor 300.

Figure 12:
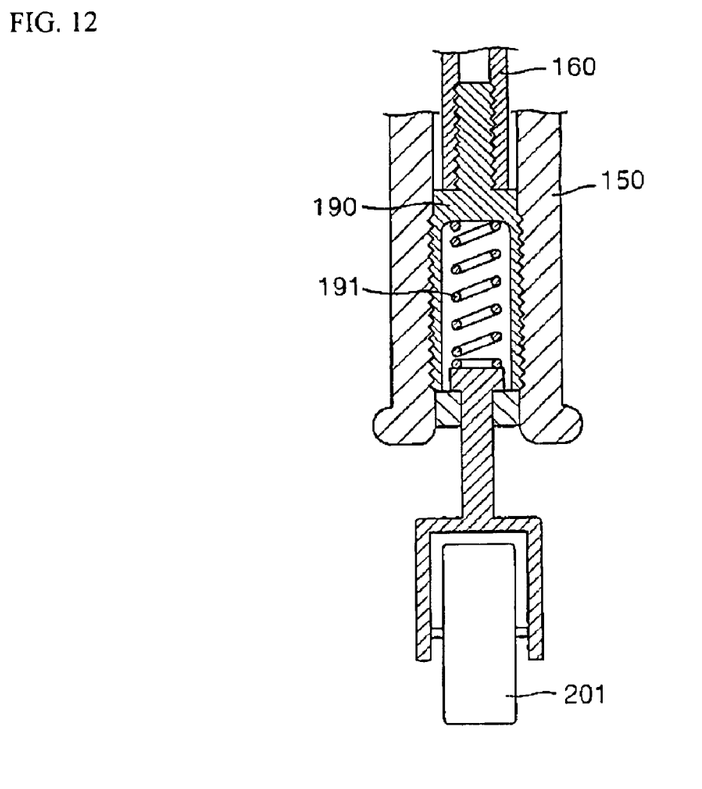
FIG. 12 is a cross-sectional view schematically showing a buffering portion of the handle bar.

Also, as shown in FIG. 12, a buffering unit which can absorb impacts through the front wheel 201 during running is provided in the 3-wheel vehicle board. The buffering unit includes a coupling block 190 whose one end is coupled with the first hollow shaft 150 and other end is coupled with the second hollow shaft 160, and a spring 191 accommodated in the coupling block 190 and elastically supporting the front wheel 201. The first and second rotatable links 240 and 250 are connected with a connection block 260 of FIG. 9B by a spherical bearing (not shown), so as to thereby freely rotate.

The 3-wheel vehicle board having the above-described structure according to the present invention is used as follows.

A user grips the handle bars 110 and 120 and steps on the footholds 204 and 205, and then repeatedly makes the handle bar shaft 140 inclined left and right. In this case, when weight of the user is applied forwards, the 3-wheel vehicle board starts to advance forwards. If a user steps on one foothold 204 or 205 with his/her one foot and generates a forwarding frictional force with respect to the ground with his/her other foot in order to obtain an initial driving force, and then steps on both the footholds 204 and 205 with his/her feet, the 3-wheel vehicle board can advance with a better initial driving force. When the handle bar shaft 140 is made inclined left and right, the first and second rotatable links 240 and 250 are connected to the connection block 260 with a spherical bearing. Accordingly, the first and second rotatable links 240 and 250 are inclined to a degree as much as the rear wheels 202 and 203 are inclined. Meanwhile, height of the handle bar shaft 140 is adjusted according to the physical conditions of a user. Referring to FIG. 8, the fixing protrusion 141 is fixedly coupled with a desired locking hole 161 among the locking holes 161 formed with a predetermined interval up and down to match the physical size of the user. The elastic plate 162 is pressed by rotation of the locker 163 to make the handle bar shaft 140 further stably fixed to the second hollow shaft 160.

Referring to FIGS. 9A through 9C, the locking pin blocks 170 are separated from assembly of the first and second rotatable links 240 and 250 and the first and second foothold links 210 and 220, and the first and second foothold links 210 and 220 are rotated and folded around the hinge axes 208 and 209. In this case, the whole volume of the 3-wheel vehicle board is reduced so as to easily keep it in custody and carry it. As shown in FIG. 9C, when the operational rod 172 is pressed, the locking pin block 170 can be separated since the fixing ball 174 is inserted into the recess 172a of the operational rod 172. In this manner, the locking pin block 170 can be separated and coupled by a simple operation from and with the 3-wheel vehicle board.

As shown in FIG. 7A, when the bent handle bars 110 and 120 are selectively fixed to the throughholes 131 on the handle bar fixing unit 130, a user can take a variety of driving postures. Also, impacts transferred through the front wheel 201 during running are buffered by the spring 191, to thereby enhance a sense of boarding on or driving the 3-wheel vehicle board. In particular, the impact sensor 300 operates by vibration of the 3-wheel vehicle board from the ground to make the lamp 320 light to thereby enable a safe run.

As described above, the 3-wheel vehicle board according to the present invention has the following advantages.

First, since the locking holes 161 are formed up and down with a predetermined interval on the second hollow shaft 160, heights of handle bars can be selectively and conveniently adjusted by the locking protrusions 141, and the adjusted heights of the handle bars can be stably maintained.

Second, since the handle bars 110 and 120 are bent, a driving posture of a user can be changed in various forms.

Third, the links can be simply assembled and disassembled with and from each other by press of the operational rod 172 in the locking pin block 170.

Fourth, a spring which absorbs impacts caused by contact to the ground during running is employed to thereby enhance a sense of boarding.

Finally, at least one ambient lighting is provided to thereby prevent a safety accident during running at night.

What is claimed is:

1. A 3-wheel vehicle board comprising:
   a pair of handle bars provided in the upper end thereof;
   a handle bar shaft with the lower end of which a front wheel is rotatably combined;
   a second hollow shaft with which the handle bar shaft is slidably combined;
   a first hollow shaft with which the second hollow shaft is rotatably combined;

a locking/unlocking unit for fixing and releasing position of the handle bar shaft with respect to the second hollow shaft;

a fixing block which is fixed to the lower end of the first hollow shaft;

first and second rotatable links with each one end of which each one end of the fixing block is rotatably combined;

a connection block with each one end of which the respective middle portions of the first and second rotatable links are rotatably combined, and with the middle portion of which the fixing block is rotatably combined;

first and second foothold links which are rotatably combined with each one end of the first and second rotatable links with a hinge pin and on each one end of which each foothold and each rear wheel are provided; and a clamping unit which fixes the first and second foothold links horizontally and vertically with respect to the first and second rotatable links, wherein the clamping unit includes locking pin blocks penetratively coupled with the first and second foothold links and the first and second rotatable links, respectively, and the locking pin blocks each comprises a hollow body having a coupling hole with which a fixing ball is coupled in and out, an operational rod having a recess into which the fixing ball is inserted so as to be slidably coupled with the hollow body, and a spring elastically biasing the operational rod in one direction with respect to the hollow body, wherein a handle bar fixing unit is fixed to the upper end of the handle bar shaft in which a plurality of through-holes through which the handle bars are attachably and detachably coupled are formed on both ends of the handle bar fixing unit, wherein each handle bar is bent on the one end of which a coupling portion coupled with the handle bar fixing unit is formed and on the other end of which a handle bar grip portion is formed, and wherein locking protrusions coupled with the through-holes in the handle bar fixing unit are coupled in and out with the handle bar coupling portion.

2. The 3-wheel vehicle board of claim 1, wherein the locking/unlocking unit has a structure that locking holes are formed up and down with a predetermined interval on the second hollow shaft and fixing protrusions locked into the locking holes are coupled in and out with the handle bar shaft.

3. The 3-wheel vehicle board of claim 2, further comprising a spring installed in the first hollow shaft to absorb the impacts from the front wheel.

4. The 3-wheel vehicle of claim 2, further comprising an impact sensor which detects the impacts from the ground during running, and at least one lamp which lights according to the detection of impacts from the impact sensor, so as to be easily identified during running at night.

5. The 3-wheel vehicle board of claim 1, further comprising a spring installed in the first hollow shaft to absorb the impacts from the front wheel.

6. The 3-wheel vehicle board of claim 1, further comprising an impact sensor which detects the impacts from the ground during running, and at least one lamp which lights according to the detection of impacts from the impact sensor, so as to be easily identified during running at night.

* * * * *